US007583949B2

(12) United States Patent
Someya

(10) Patent No.: US 7,583,949 B2
(45) Date of Patent: Sep. 1, 2009

(54) RADIO WAVE RECEIVING DEVICE AND RADIO WAVE RECEIVING CIRCUIT

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 711 days.

(21) Appl. No.: 11/176,098

(22) Filed: Jul. 7, 2005

(65) Prior Publication Data

US 2006/0023572 A1 Feb. 2, 2006

(30) Foreign Application Priority Data

Jul. 28, 2004 (JP) ............................ 2004-220375

(51) Int. Cl.
*H04B 1/26* (2006.01)

(52) U.S. Cl. .......................... 455/313; 455/73; 455/78; 368/46; 368/47

(58) Field of Classification Search .................. 455/313
See application file for complete search history.

(56) References Cited

U.S. PATENT DOCUMENTS

| | | | | |
|---|---|---|---|---|
| 4,152,652 A * | 5/1979 | Taylor et al. | ............. | 455/226.2 |
| 6,288,977 B1 * | 9/2001 | Yoshida et al. | ................ | 368/47 |
| 6,459,657 B1 * | 10/2002 | Takada et al. | ................. | 368/46 |
| 7,027,363 B2 * | 4/2006 | Kawaguchi | .................. | 368/47 |
| 7,042,808 B2 * | 5/2006 | Saitoh | ......................... | 368/47 |
| 2007/0164903 A1 * | 7/2007 | Takada | ....................... | 342/389 |

FOREIGN PATENT DOCUMENTS

| | | | |
|---|---|---|---|
| JP | 5-46181 | U | 6/1993 |
| JP | 9-113647 | A | 5/1997 |
| JP | 3481878 | B2 | 10/2003 |
| JP | 2004-45315 | A | 2/2004 |
| JP | 2004-77375 | A | 3/2004 |
| JP | 2004-80073 | A | 3/2004 |
| JP | 2004-179948 | A | 6/2004 |

* cited by examiner

*Primary Examiner*—Yuwen Pan
*Assistant Examiner*—Ajibola Akinyemi
(74) *Attorney, Agent, or Firm*—Frishauf, Holtz, Goodman & Chick, P.C.

(57) ABSTRACT

A frequency switching signal for switching a reception frequency of an antenna based on a reception success or failure signal output from a detection circuit and a standard time code output from a demodulator is output to a reception frequency selection circuit. The reception frequency is switched to the frequency which is the same as an intermediate frequency other than that of the standard radio waves, and at the same time, an output temporarily stopping signal is output to a local oscillation circuit to temporarily stop the output of a local oscillation signal of the local oscillation circuit, enabling to output the reception signal which was received by the antenna as the intermediate frequency signal without synthesizing and converting it in the frequency conversion circuit to be detected by a detection circuit.

Thereby, the reception of the radio wave composed of a plurality of frequencies can be realized with a simple structure.

10 Claims, 11 Drawing Sheets

RADIO WAVE RECEIVING DEVICE AND RADIO WAVE RECEIVING CIRCUIT

CROSS-REFERENCE TO RELATED APPLICATIONS

This application is based upon and claims the benefit of priority from the prior Japanese Patent Application No. 2004-220375, filed on Jul. 28, 2004, and the entire contents of which are incorporated herein by reference.

BACKGROUND OF THE INVENTION

1. Field of the Invention

The present invention relates to a radio wave receiving device.

2. Description of Prior Art

Currently, a long-wave standard wave including time data or time code is transmitted in various countries (for example, Japan, America, Germany and the like). In Japan, the long-wave standard waves of 40 kHz and 60 kHz that have been subjected to amplitude modulation by the time code are transmitted from two transmitting stations in Hukushima prefecture and Saga prefecture.

A watch so-called radio wave watch which corrects the time data of a timekeeping circuit has been put to practical use as a radio wave receiving device to receive this standard wave. The radio wave watch of this kind cannot receive the standard wave in a building in which the radio wave is hard to reach, so that the time may not be corrected. As a technique to correct the time of the radio wave watch in an environment where it is difficult to receive the standard wave, the technique to relay the standard wave has been known, and a repeater has been also known as a device for this technique.

The repeater receives the standard wave, and transmits the time data included in the standard wave through a relayed radio wave.

An example of the repeater includes one which transmits the time date included in the received standard wave by infrared radiation.

The standard wave is transmitted from the two transmitting stations with different frequencies in Japan. Therefore, a radio wave watch and a repeater which can receive the standard wave of both frequencies of 40 kHz and 60 kHz, that is, the radio wave watch and the repeater which was multibanded have been known. Specifically, there is one which selectively receives one of the standard waves of two frequencies, and converts the received standard wave into a relayed radio wave to transmit it.

However, in the above case, the frequency of the relayed radio wave transmitted by the repeater is the same as the frequency of the standard wave, so that the relayed radio wave is superposed on the standard wave transmitted from the transmitting station. Thus, if the standard wave and the replayed radio wave are out of phase, the original standard wave may be damaged, thereby interfering with the reception of the original standard wave.

For solving the problems, considered is a structure in which a repeater transmits a time data included in a received standard wave to a radio wave watch through a replayed radio wave of infrared radiation, and the radio wave watch can receive both of the standard wave transmitted from the transmitting station and the relayed radio wave of the infrared radiation transmitted from the repeater. With this structure, since the relayed radio wave is the infrared radiation, the relayed radio wave is not superposed on the standard wave.

However, in this case, the radio wave watch needs to comprise both of a receiving circuit for the standard wave and a receiving circuit for the infrared radiation. Therefore, two systems of the receiving circuits with different reception frequencies are provided, which increase the size of the circuit of the radio wave watch.

Meanwhile, considered is a radio wave watch of superheterodyne system in which the frequency of the relayed radio wave is set to low frequency, and the standard wave and the relayed radio wave are selectively received. However, in this system, a reception signal and a local oscillation signal are synthesized to be converted into an intermediate-frequency signal having a predetermined frequency, so that the frequency of the local oscillation signal needs to be changed according to a reception frequency.

SUMMARY OF THE INVENTION

Thus, in the present invention, a judgment is made whether or not the standard wave is successfully received based on a reception success or failure signal output from a detection circuit and a standard time code output from a demodulator, and when the standard wave was not successfully received, the reception frequency is switched to the frequency which is the same as the intermediate frequency other than the standard wave, and at the same time, the output of the local oscillation signal from the local oscillation circuit is temporarily stopped.

Thereby, the reception signal received by an antenna can be output as the intermediate frequency signal without synthesizing and converting it in the frequency conversion circuit, and can be detected by the detection circuit. That is, the reception of the radio wave composed of a plurality of frequencies can be realized with a simple structure.

DETAILED DESCRIPTION OF THE PREFERRED EMBODIMENTS

First Embodiment

Figure 1:
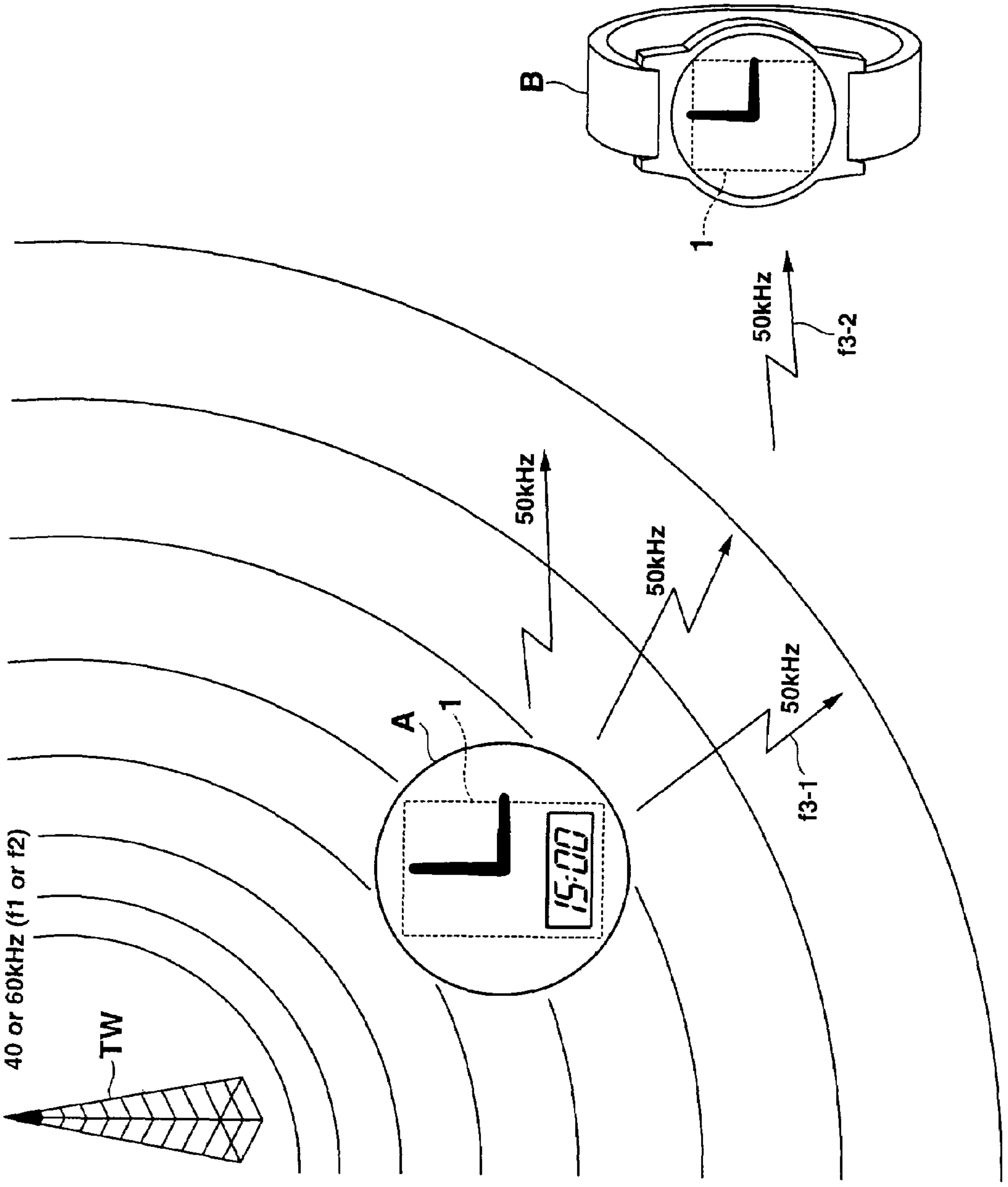
FIG. 1 is a view for explaining an outline of a radio wave watch of the first embodiment in which the present invention is applied.

Hereinafter, the first embodiment in which a radio wave watch control device of the present invention is applied will be described in detail by reference to FIGS. 1 to 6. However, the scope of the present invention is not limited to the examples shown in the drawings.

FIG. 1 is a view for explaining an outline of operations of radio wave watches A and B in each of which the same radio wave watch control device 1 is stored. This figure shows a condition in which a standard wave f1 (or f2) of 40 kHz (or 60 kHz) is transmitted from a transmitting station TW, the radio wave watch A can receive the standard wave f1, and the radio wave watch B cannot receive the standard wave f1.

Therefore, in the radio wave watch A, the current time which is measured by the radio wave watch control device 1 can be corrected by using the time information included in the standard wave f1. However, the current time in the radio wave watch B cannot be corrected. Thus, in the first embodiment, the radio wave watch A in which the current time was corrected starts transmitting the measured current time which has been corrected through a relayed radio wave f3-1 of 50 kHz. Meanwhile, the radio wave watch B switches the reception frequency to 50 kHz to receive a relayed radio wave f3-2 transmitted from the other radio wave watch. In the figure, the radio wave watch B can receive the relayed radio wave f3-2. As above, the radio wave watch B which could not receive the standard wave can correct the current time by using the time information included in the relayed radio wave f3-2 which is transmitted from the other radio wave watch. Accordingly, even the radio wave watch B which is in the condition not to be able to receive the standard wave can correct the current time, if the radio wave watch B can receive the relayed radio wave f3-2 transmitted from the other radio wave watch which succeeded in receiving the standard wave.

Figure 2:
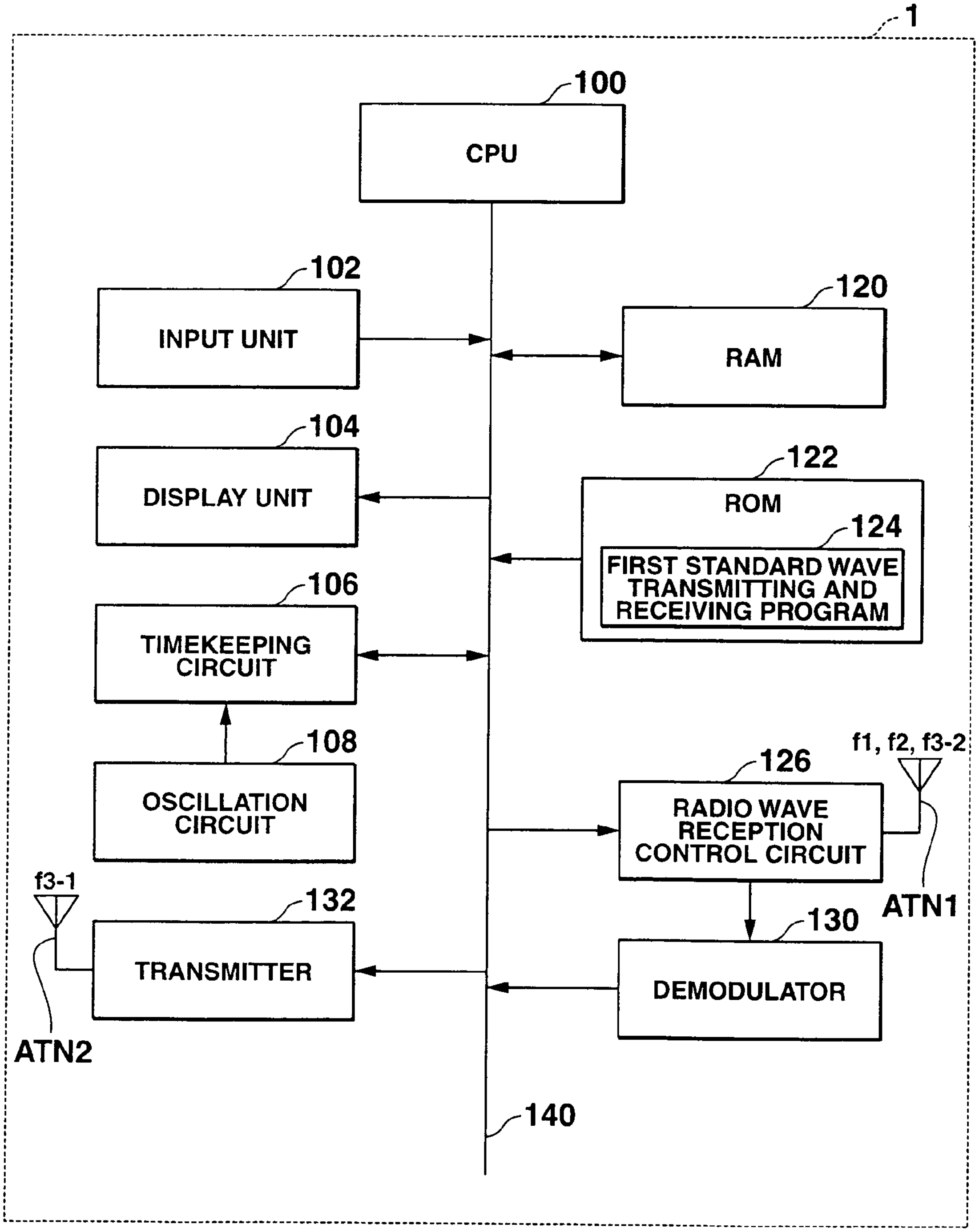
FIG. 2 is a block diagram showing a functional structure of a radio wave watch control device of the first embodiment in which the present invention is applied.

FIG. 2 is a block diagram showing one example of a functional structure of the radio wave watch control device 1. In this figure, the radio wave watch control device 1 is structured such that a CPU (Central Processing Unit) 100, an input unit 102, a display unit 104, a timekeeping circuit 106 which measures a clock signal output from an oscillation circuit 108 and obtains the current time data, a RAM (Random Access Memory) 120, a ROM (Read Only Memory) 122, a radio wave reception control circuit 126 and a demodulator 130 are connected to a bus 140.

The CPU 100 reads out various programs stored in the ROM 122 and expands the programs in the RAM 120 corresponding to a predetermined timing or an actuating signal input from the input unit 102, and executes an instruction, a data transfer and the like to each functional part based on the programs. For example, the CPU 100 controls the radio wave reception control circuit 126 every predetermined time to make it receive the standard wave or the relayed radio wave. Moreover, the CPU 100 performs various controls such as correcting the current time data measured by the timekeeping circuit 106 based on the standard time code which is output from the demodulator 130 and also updating the display of the current date and time based on the corrected current time data, and the like.

The input unit 102 comprises a switch or the like for instructing an execution of various functions to the radio wave watch. When the switch is pressed by a user, a corresponding actuating signal is output to the CPU 100.

The display unit 104 is one comprising a LCD (Liquid Crystal Display), a segment type display or the like, and displays the current date and time or the like based on the display data output from the CPU 100.

The timekeeping circuit 106 counts the clock signals output from the oscillation circuit 108 to obtain the current time data, and outputs this current time data to the CPU 100. The oscillation circuit 108 comprises a crystal oscillator and the like, and outputs the clock signal having always constant frequency to the timekeeping circuit 106.

The RAM 120 is a storage region for temporarily storing various programs executed by the CPU 100, the data for executing these programs and the like under the control by the CPU 100.

The ROM 122 mainly stores a system program, an application program and the like for the radio wave watch. In FIG. 2, the ROM 122 stores a first standard wave transmitting and receiving program 124. The first standard wave transmitting and receiving program 124 is a program for realizing the first standard wave transmitting and receiving process (refer to FIG. 6) for performing the reception control of the standard wave, the transmitting control of the relayed radio wave and the like. Specifically, the CPU 100 reads out the first standard wave transmitting and receiving program 124 from the ROM 122 and expands it in the RAM 120, thereby performing the first standard wave transmitting and receiving process.

The radio wave reception control circuit 126 cuts unnecessary frequencies in the standard wave received by an antenna ANT1 to take the signal with corresponding frequency, and then detects the taken signal to output to the demodulator 130.

The demodulator 130 demodulates the signal output from the radio wave reception control circuit 126 to thereby output it to the CPU 100. The signal output from the demodulator 130 is a standard time code TC including the standard time code, an accumulated day code, a day code and the like that are necessary for the watch functions.

A transmitter 132 modulates a carrier having a predetermined frequency based on a time data TD and the like which is output from the CPU 100 to generate a relayed radio wave f3 having the same format of the standard wave, and transmits it from an antenna ANT2.

Figure 3:
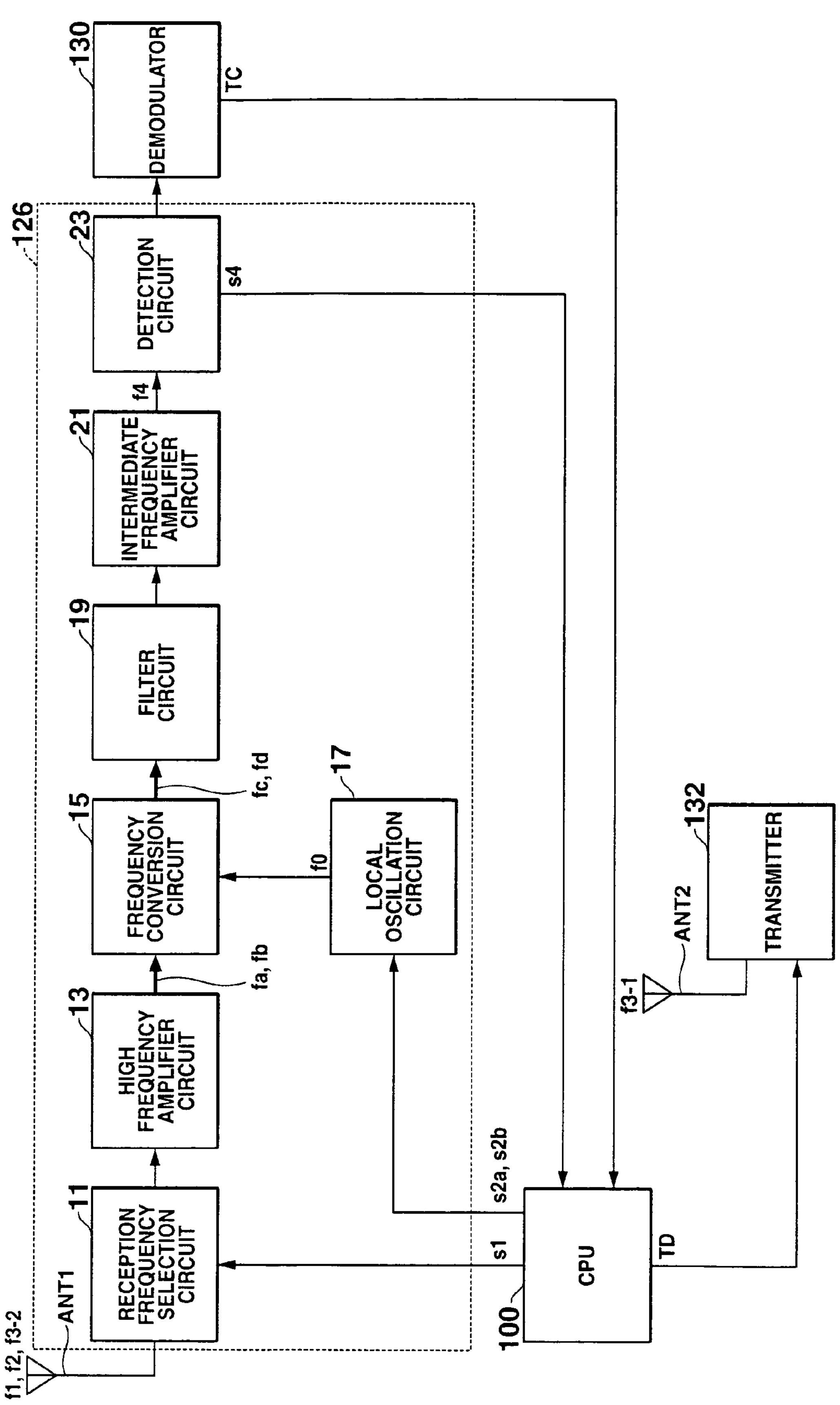
FIG. 3 is a block diagram showing one example of a functional structure of a radio wave reception control circuit of the first embodiment in which the present invention is applied.

FIG. 3 is a block diagram showing a functional structure of the radio wave reception control circuit 126. In this figure, the radio wave reception control circuit 126 comprises the antenna ANT1, a reception frequency selection circuit 11, a high frequency amplifier circuit 13, a frequency conversion circuit 15, a local oscillation circuit 17, a filter circuit 19, an intermediate frequency amplifier circuit 21 and a detection circuit 23. The radio wave reception control circuit 126 functions as both of the super-heterodyne system and the straight system.

The antenna ANT1 comprises a bar antenna and the like, and is integrally configured with the reception frequency selection circuit 11. The antenna ANT1 and the reception frequency selection circuit 11 are configured to be able to receive a radio signal with a plurality of different frequencies, and receive the radio signal with the reception frequency corresponding to the tuning control by the reception frequency selection circuit 11. Then, the received radio signal is converted into an electric signal (reception signal) to thereby output to the high frequency amplifier circuit 13. Specially, in this embodiment, the antenna ANT1 receives radio signals of three frequencies of the standard wave f1 having a first frequency F1 which is a first transmitting frequency (for example, 40 kHz), the standard wave f2 having a second frequency F2 which is a second transmitting frequency (for example, 60 kHz) and the relayed radio wave f3 having a third frequency F3 which is a third transmitting frequency (for example, 50 kHz).

The reception frequency selection circuit 11 switches a tuning frequency of the antenna ANT1 based on a frequency switching signal s1 which is output from the CPU 100, and outputs the reception signal output from the antenna ANT1 to the high frequency amplifier circuit 13.

The high frequency amplifier circuit 13 amplifies the reception signal output from the reception frequency selection circuit 11 to thereby output it to the frequency conversion circuit 15 as amplified signals fa and fb. The amplified signal fb is a signal produced by subjecting the amplified signal fa to phase inversion.

The frequency conversion circuit 15 synthesizes (multiplies) a local oscillation signal f0 provided from the oscillation circuit 17 with the amplified signals fa and fb output from the high frequency amplifier circuit 13, thereby converting the reception signal to a signal of an intermediate frequency Fi (intermediate frequency signals fc, fd) and outputting them to the filter circuit 19. When the local oscillation signal f0 is not provided from the oscillation circuit 17, the frequency conversion circuit 15 outputs the amplified signals fa and fb which are output from the high frequency amplifier circuit 13 to the filter circuit 19 as the intermediate frequency signals fc, fd as it is.

Figure 4:
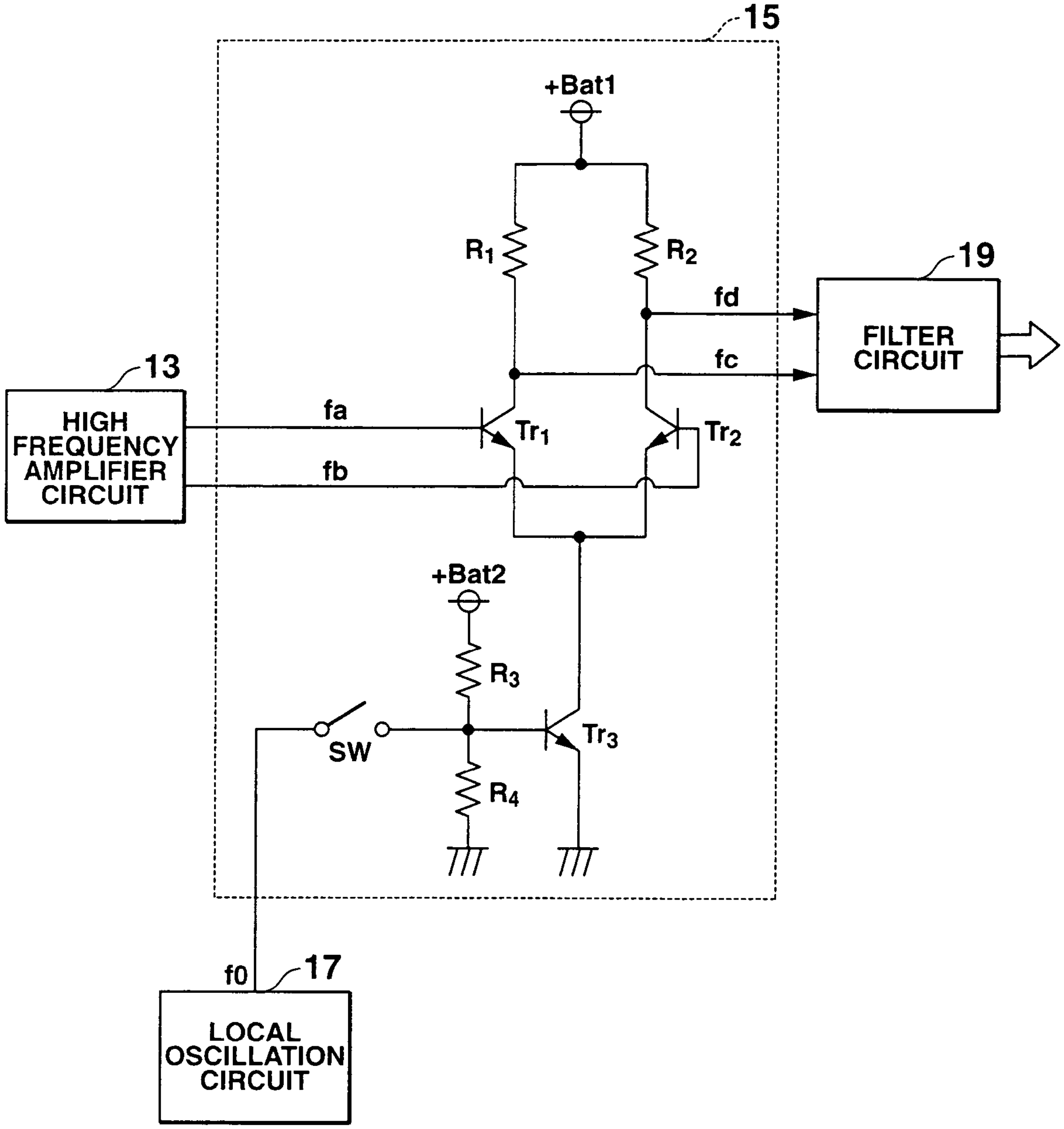
FIG. 4 is a view showing one example of a circuit structure of a frequency conversion circuit of the embodiment in which the present invention is applied.
Figure 5:
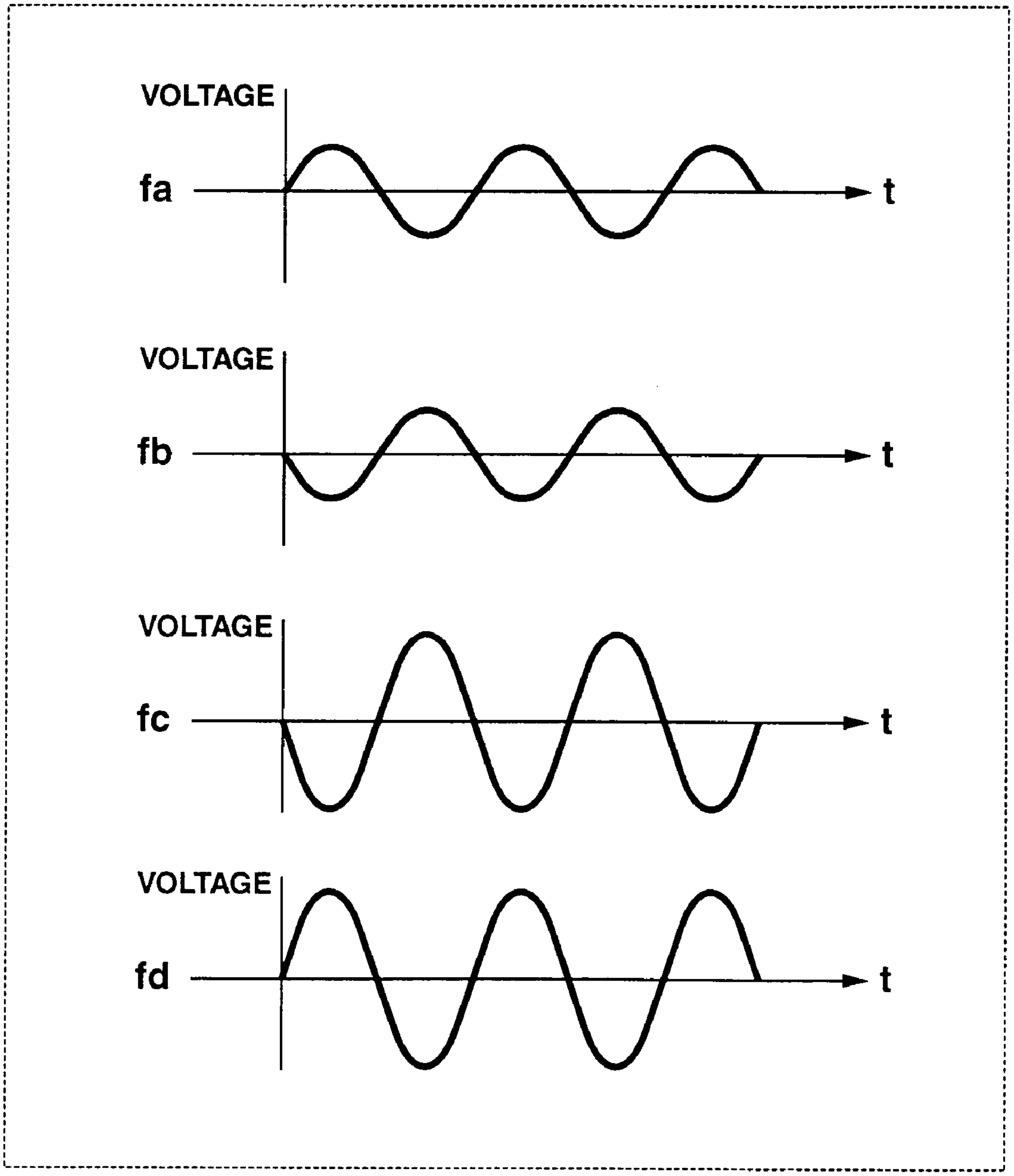
FIG. 5 is a first view showing one example of a waveform of an input/output signal of the frequency conversion circuit of the embodiment in which the present invention is applied.

FIG. 4 is a view showing one example of a circuit structure in the case of forming the frequency conversion circuit 15 with a differential amplifier circuit. FIG. 5 is a view showing one example of a general waveform of an input/output signal of the frequency conversion circuit 15. The action of the frequency conversion circuit 15 will be briefly explained below by reference to the drawings.

First, the explanation will be made in the case where a switch SW is OFF by the control of the CPU 100. In this case, the local oscillation signal f0 is not provided from the oscillation circuit 17, a constant voltage according to the voltage division ratio between a resistor R3 and the resistor R4 is applied to a base of a transistor Tr3, and the Tr3 becomes always ON when the voltage between the base and the emitter of the Tr3 becomes not less than a predetermined voltage. Consequently, the amplified signals fa, fb input from the high frequency amplifier circuit 13 are subjected to differential amplification by the transistors Tr1, Tr2, respectively, and are output as signals fc, fd that were subjected to inverting amplification.

Next, the explanation will be made in the case where the switch SW is ON by the control of the CPU 100. In this case, the local oscillation signal f0 is applied to the base of the transistor Tr3 with the constant voltage according to the voltage division ratio between the resistor R3 and the resistor R4 as the bias. Meanwhile, the amplified signals fa, fb input from the high frequency amplifier circuit 13 are subjected to differential amplification by the transistors Tr1, Tr2, respectively, and the local oscillation signal f0 is mixed. Consequently, a frequency component expressed by the formula (j) as the intermediate frequency signal fc, and a frequency component expressed by the formula (k) as the intermediate frequency signal fd are generated, thus enabling to perform frequency conversion.

$$|fa \pm f0| \tag{j}$$

$$|fb \pm f0| \tag{k}$$

The oscillation circuit 17 comprising a crystal oscillator and the like generates the local oscillation signal f0 of a predetermined local oscillation frequency F0 (for example, 10 kHz) to output to the frequency conversion circuit 15.

Specific circuit structure of the frequency conversion circuit 15 and the oscillation circuit 17 may be a circuit as follows. That is, it is assumed that the oscillation circuit 17 outputs the local oscillation signal f0 or a signal with a constant voltage level. Meanwhile, it is assumed that the frequency conversion circuit 15 always multiplies the reception signal and the signal input from the oscillation circuit 17. Consequently, when the local oscillation signal f0 is output from the oscillation circuit 17, the reception signal is converted into the intermediate frequency signals fc, fd to be output to the filter circuit 19. When the signal with a constant voltage level is output from the oscillation circuit 17, the reception signal is output to the filter circuit 19 without the frequency being changed.

The filter circuit 19 comprises a bandpass filter and the like. The filter circuit 19 allows frequencies of the intermediate frequency signals fc, fd output from the frequency conversion circuit 15 within a predetermined range with the intermediate frequency Fi (for example, 50 kHz) as a center to pass to thereby cut off the frequency component out of the range, and output them.

The intermediate frequency amplifier circuit 21 amplifies the intermediate frequency signals fc, fd which were output from the filter circuit 19 to output them to the detection circuit 23.

The detection circuit 23 comprises, for example, a PLL (Phase Locked Loop) circuit and the like. The detection circuit 23 detects the intermediate frequency signals fc, fd (intermediate frequency amplified signal f4) amplified by the intermediate frequency amplifier circuit 21 in a detection method such as a synchronous detection, an envelope detection, a peak detection or the like, and outputs them to the demodulator 130 as a detected signal. Moreover, the detection circuit 23 judges that whether or not the signal level of the intermediate frequency amplified signal f4 is not less than a predetermined signal level. When the receiver sensitivity of the radio signal having the current reception frequency is not good, the signal level of the intermediate frequency amplified signal f4 becomes low. Thus, the detection circuit 23 judges that whether or not the signal level of the intermediate frequency amplified signal f4 is not less than the predetermined level, and outputs the judged result to the CPU 100 as a reception success or failure signal s4.

The CPU 100 normally receives the currently receiving radio signal and obtains the time information by the reception success or failure signal s4 output from the detection circuit 23 and the standard time code TC output from the demodulator 130, and judges that whether or not the radio signal was successfully received. Specifically, when the reception success or failure signal s4 showing that the signal level of the intermediate frequency amplified signal f4 is not less than the predetermined signal level is output from the detection circuit 23, or when the standard time code TC output from the demodulator 130 is in the correct format, the CPU 100 judges that the radio wave was successfully received, that is, the correct time information was detected. The method to judge whether the standard time code TC is in the correct format or not is realized by, for example, performing judgment using the parity bit in the standard time code TC (refer to FIG. 11), judging whether or not the obtained time information is appropriate value or the like.

Next, a method to receive the radio signal having a plurality of frequencies is explained.

First, the explanation will be made for the setting method of the local oscillation frequency F0 for receiving both of the standard waves f1 and f2 with a specific example. In the first embodiment, the local oscillation frequency F0 is set to the average of the difference between the first frequency F1 and the second frequency F2.

For example, when F1=40 kHz and F2=60 kHz, F0 is expressed by the following formula.

$$F0=(60-40)/2=10\ [\text{kHz}] \qquad (a)$$

When the standard wave f1 with the first frequency F1 is received, the intermediate frequency Fi of the signal which is multiplied by the local oscillation signal f0 having the frequency F0 to be output by the frequency conversion circuit 15 is expressed by the following formula (b) or (c).

$$|F1|+F0|=|40+10|=50\ [\text{kHz}] \qquad (b)$$

$$|F1|-F0|=|40-10|=30\ [\text{kHz}] \qquad (c)$$

When the standard wave f2 with the second frequency F2 is received, the intermediate frequency Fi of the signal which is multiplied by the local oscillation signal f0 having the frequency F0 to be output by the frequency conversion circuit 15 is expressed by the following formula (d) or (e).

$$|F2+F0|=|60+10|=70\ [\text{kHz}] \qquad (d)$$

$$|F2-F0|=|60-10|=50\ [\text{kHz}] \qquad (e)$$

Accordingly, when the set frequency of the filter circuit 19 is 50 kHz, the intermediate frequency signals fc, fd which were subjected to frequency conversion by the formulas (b) and (e) pass through the filter circuit 19, and are output to the intermediate frequency amplifier circuit 21. Meanwhile, the intermediate frequency signals fc, fd which were subjected to frequency conversion by the formulas (c) and (d) are cut off by the filter circuit 19.

The local oscillation frequency F0 may be set to an arithmetic average of the first frequency F1 and the second frequency F2 ((60+40)/2=50 [kHz]). In the case of receiving the standard wave f1, the intermediate frequency Fi of the intermediate frequency signals fc, fd which are subjected to frequency conversion to be output is expressed by the following formula (f) or (g).

$$|F1+F0|=|40+50|=90\ [\text{kHz}] \qquad (f)$$

$$|F1-F0|=|40-50|=10\ [\text{kHz}] \qquad (g)$$

In the case of receiving the standard wave f2, the intermediate frequency Fi of the intermediate frequency signals fc, fd is expressed by the following formula (h) or (i).

$$|F2+F0|=|60+50|=110\ [\text{kHz}] \qquad (h)$$

$$|F2-F0|=|60-50|=10\ [\text{kHz}] \qquad (i)$$

Accordingly, if the set frequency of the filter circuit 19 is 10 kHz, the signals which were subjected to frequency conversion by the formulas (g) and (i) pass through the filter circuit 19, and are output to the intermediate frequency amplifier circuit 21.

Setting the local oscillation frequency F0 in this way allows the radio wave reception control circuit 126 which functions as the super-heterodyne system to receive the standard waves f1 and f2 without changing the local oscillation frequency F0. In the following explanation, the local oscillation frequency F0 is set to the average of the difference between the first frequency F1 and the second frequency F2 (50 kHz).

Next, the explanation will be made for the operation of the radio wave reception control circuit 126 for receiving the relayed radio wave of the third frequency F3 other than the standard waves f1 and f2 of the first and second frequencies, which is characteristic in the first embodiment.

First, in the case where the CPU 100 judged that the radio wave watch failed in receiving the currently receiving standard waves f1 (40 kHz) and f2 (60 kHz) with the use of the reception success or failure signal s4 output from the detection circuit 23 and the standard time code TC output from the demodulator 130, the CPU 100 controls to output the frequency switching signal s1 to the reception frequency selection circuit 11, so that the reception frequency is switched to 50 kHz (third frequency F3). When the reception frequency was switched to the third frequency F3, an output temporarily stopping signal s2*a* is output to the oscillation circuit 17 to temporarily stop the output of the local oscillation signal f0.

At this time, the reception signal of the relayed radio wave f3 which was received by the antenna ANT1 is amplified by the high frequency amplifier circuit 13. Since the local oscillation signal f0 is not output from the oscillation circuit 17, the frequency conversion circuit 15 outputs the intermediate frequency signals fd, fc to the filter circuit 19 without synthesizing and converting the local oscillation signal f0 to the amplified signals fa and fb (50 kHz) output from the high frequency amplifier circuit 13. Since the set frequency of the filter circuit 19 is 50 kHz, the intermediate frequency signals fd, fc output from the frequency conversion circuit 15 pass through the filter circuit 19. These intermediate frequency signals fd, fc are subjected to amplification by the intermediate frequency amplifier circuit 21 and detection by the detection circuit 23.

As above, when receiving the relayed radio wave f3 of the third frequency F3 which has the same frequency as the intermediate frequency Fi, the frequency conversion circuit 15 doe not perform synchronization and conversion with the local oscillation signal f0. In this case, the radio wave reception control circuit 126 has a circuit structure corresponding to a receiving circuit of the straight system in which a reception signal is directly detected.

Accordingly, the CPU 100 performs the switching control of the reception frequency of the reception frequency selection circuit 11 and the output stop control of the local oscillation signal f0 by the oscillation circuit 17, so that the radio wave reception control circuit 126 functions as both of the super-heterodyne system and the straight system. The reception frequency in the super-heterodyne system is the first frequency F1 and the second frequency F2, and the reception frequency in the straight system is the third frequency F3, thus enabling to receive radio waves with three frequencies.

The transmitter 132 generates a carrier with the frequency which is the same as the intermediate frequency Fi, and modulates it according to the time data TD output from the CPU 100 to thereby generate the relayed radio wave f3 and transmit it from the antenna ANT2.

The time data TD is the current time data measured by the timekeeping circuit 106. The transmitter 132 transmits the time data TD output from the CPU 100 in the format of the standard time code.

The frequency of the relayed radio wave f3 transmitted by the transmitter 132 is the same as the intermediate frequency Fi, so that the frequency of the relayed radio wave f3 is different from those of the standard waves f1 and f2. Thus, the relayed radio wave f3 is not superposed on the standard waves f1 and f2, and does not interfere with the standard waves f1 and f2.

Next, a specific operation of the first standard wave transmitting and receiving process of the radio wave watch control device 1 will be explained referring to the flow chart in FIG. 6. The first standard wave transmitting and receiving process starts when the first standard wave transmitting and receiving program 124 is read out from the ROM 122 by the CPU 100 at a predetermined time (for example, 15:00). In the following explanation, a relayed radio wave transmitted by the radio wave watch control device 1 is defined as a relayed radio wave f3-1, and a relayed radio wave received by the other radio wave watch control device 1 is defined as a relayed radio wave f3-2.

First, when the first standard wave transmitting and receiving process is started, the CPU 100 drives the radio wave reception control circuit 126 and the demodulator 130 to start the reception of the standard wave (for example, the standard wave f1 of 40 kHz) (standard wave reception control process; Step A1).

The CPU 100 judges whether or not the radio wave watch succeeded in receiving the standard wave by the reception success or failure signal s4 output from the detection circuit 23 and the standard time code TC output from the demodulator 130 (that is, whether or not the correct time information is detected) (Step A3).

In the case where the CPU 100 judged that the radio wave watch succeeded in receiving the standard wave (Step A3: Yes), the CPU 100 corrects the current time data measured by the timekeeping circuit 106 based on the standard time code TC which is output from the demodulator 130 (time correction process; Step A5).

Next, the CPU 100 obtains the current time data from the timekeeping circuit 106 (Step A7). Then, the CPU 100 generates a carrier of the intermediate frequency Fi, modulating the carrier with the use of a format of the standard wave signal to thereby instruct the transmitter 132 to transmit the obtained current time data through the relayed time data f3-1 (Step A9).

The CPU 100 judges whether or not a predetermined amount of time (for example, a few minutes) has passed since starting the instruction of transmitting the current time data (Step A11). In the case where the CPU 100 judged that the predetermined amount of time has not passed (Step A11: No), the process moves to the Step A7. In the case where the CPU 100 judged that the predetermined amount of time has passed (Step A11: Yes), the CPU 100 finishes the first standard wave transmitting and receiving process.

In the Step A3, in the case where the radio wave watch failed in receiving the standard wave (Step A3: No), the CPU 100 judges whether or not there is a receivable standard wave (for example, the standard wave f2 of 60 kHz) other than the standard wave which was controlled to receive in the Step A1 (Step A13).

In the case where the CPU 100 judged that there is other receivable standard wave (Step A13: Yes), the CPU 100 outputs the frequency switching signal s1 to the reception frequency selection circuit 11 to make the reception frequency of the antenna ANT1 switched to the frequency of the other receivable standard wave (Step A15), and thereafter the process moves to the Step A1 to control to receive the standard wave and correct the current time according to the success or failure of the reception.

Accordingly, when the radio wave watch succeeded in receiving any one of the standard waves f1 and f2, the current time data is corrected based on the time information included in the standard wave, and thereafter the CPU 100 controls to transmit the relayed radio wave f3-1 with the current time data to the other standard wave control device. Thereby, the operation of the radio wave watch A side shown in FIG. 1 can be realized.

Meanwhile, in the case where the CPU 100 judged that there is no other receivable standard wave (Step A13: No), the CPU 100 outputs the output temporarily stopping signal s2*a* to the oscillation circuit 17 to stop the output operation of the local oscillation signal f0 in the circuit (Step A17). Then, the CPU 100 controls to output the frequency switching signal s1 to the reception frequency selection circuit 11 to switch the reception frequency of the antenna ANT1 to the third frequency F3 which is the same frequency as the intermediate frequency Fi (Step A19). With the stop control of the oscillation circuit 17 and the switching control of the reception frequency, the reception of the relayed radio wave f3-2 is started.

The CPU 100 judges with the use of the reception success or failure signal s4 output from the detection circuit 23 and the standard time code TC output from the demodulator 130 whether or not the time information (time data) included in the relayed radio wave f3-2 which was transmitted from the other radio wave watch control device 1 was received with a correct format (Step A21).

In the case where the CPU 100 judged that the time information was received with the correct format (Step A21: Yes), the CPU 100 corrects the current time data which is measured by the timekeeping circuit 106 based on the standard time code TC output from the demodulator 130 (time correction process; Step A23).

Then, the CPU 100 controls to output an output restart signal s2*b* to the oscillation circuit 17 to restart the output operation of the local oscillation signal f0 (Step A25), and thereafter output the frequency switching signal s1 to the reception frequency selection circuit 11 to make the reception frequency switched to the frequency of the standard frequency (Step A27). The first standard wave transmitting and receiving process is then finished.

In the Step A21, in the case where the CPU 100 judged that the time information was not received with the correct format (Step A21: No), the CPU 100 judges whether or not a predetermined amount of time (for example, a few minutes) has passed since starting the reception of the relayed radio wave f3-2 (Step A29).

In the case where the CPU 100 judged that the predetermined amount of time has not passed (Step A29: No), the process moves to the Step A21. In the case where the CPU 100 judged that the predetermined amount of time has passed (Step A29: Yes), the CPU 100 controls to display to the display unit 104 or store to the RAM 120 the information that the current time could not been corrected (Step A31), and thereafter the process moves to the Step A25.

Accordingly, in the case of failing in receiving any one of the standard waves f1 and f2, the operation of the oscillation circuit 17 is temporarily stopped and the reception frequency of the intermediate frequency Fi is controlled to be switched to receive the relayed radio wave f3-2 which is transmitted from the other radio wave watch control device 1. Thereby, the operation of the radio wave watch B side shown in FIG. 1 can be realized.

As above, according to the first embodiment, the radio wave reception control circuit 126 has a function of the superheterodyne system in which the standard wave f1 having the first frequency F1 or the standard wave f2 having the second frequency F2 is converted into the intermediate frequency signals fc, fd to be received, and a function of the straight system in which the relayed radio wave f3 having the intermediate frequency Fi is directly received. Thereby, two frequencies of the standard waves f1 and f2 are received in the super-heterodyne system, and the relayed radio wave f3 is received in the straight system, that is, three frequencies can be received in total.

Accordingly, for receiving radio waves of three frequencies, there is no need to change the local oscillation frequency F0 in the super-heterodyne system, and also a new receiving circuit for the straight system does not need to be provided, thus enabling to receive three frequencies of the standard waves f1, f2 and the relayed radio wave f3 with a simple structure.

The transmitter 132 transmits the current time through the carrier which has the third frequency F3 as carrier frequency as the relayed radio wave f3. Since the third frequency F3 is different from the first frequency F1 and the second frequency F2, the relayed radio wave f3 is not superposed on the standard waves f1 and f2. Therefore, the relayed radio wave f3 can be transmitted without damaging the standard waves f1 and f2.

Second Embodiment

Next, a radio wave watch control device 1*b* in the second embodiment will be explained by reference to FIGS. 7 to 12. The radio watch control device 1*b* in the second embodiment is composed by replacing the CPU 100, the RAM 120, the ROM 122, the radio wave reception control circuit 126, the timekeeping circuit 106, the transmitter 132, the antenna ANT1, the antenna ANT2 in FIG. 2 with a CPU 100*b*, a RAM 120*b*, a ROM 122*b*, a radio wave reception control circuit 126*b*, a timekeeping circuit 106*b*, a transmitter 132*b*, an antenna ANT1*b*, an antenna ANT2*b*, respectively, and replacing the demodulator 130 in FIG. 3 with a demodulator 130*b*. The component that is the same as that of the radio wave watch control device 1 shown in FIG. 2 will be given the same reference numeral and the explanation thereof will be omitted.

Figure 7:
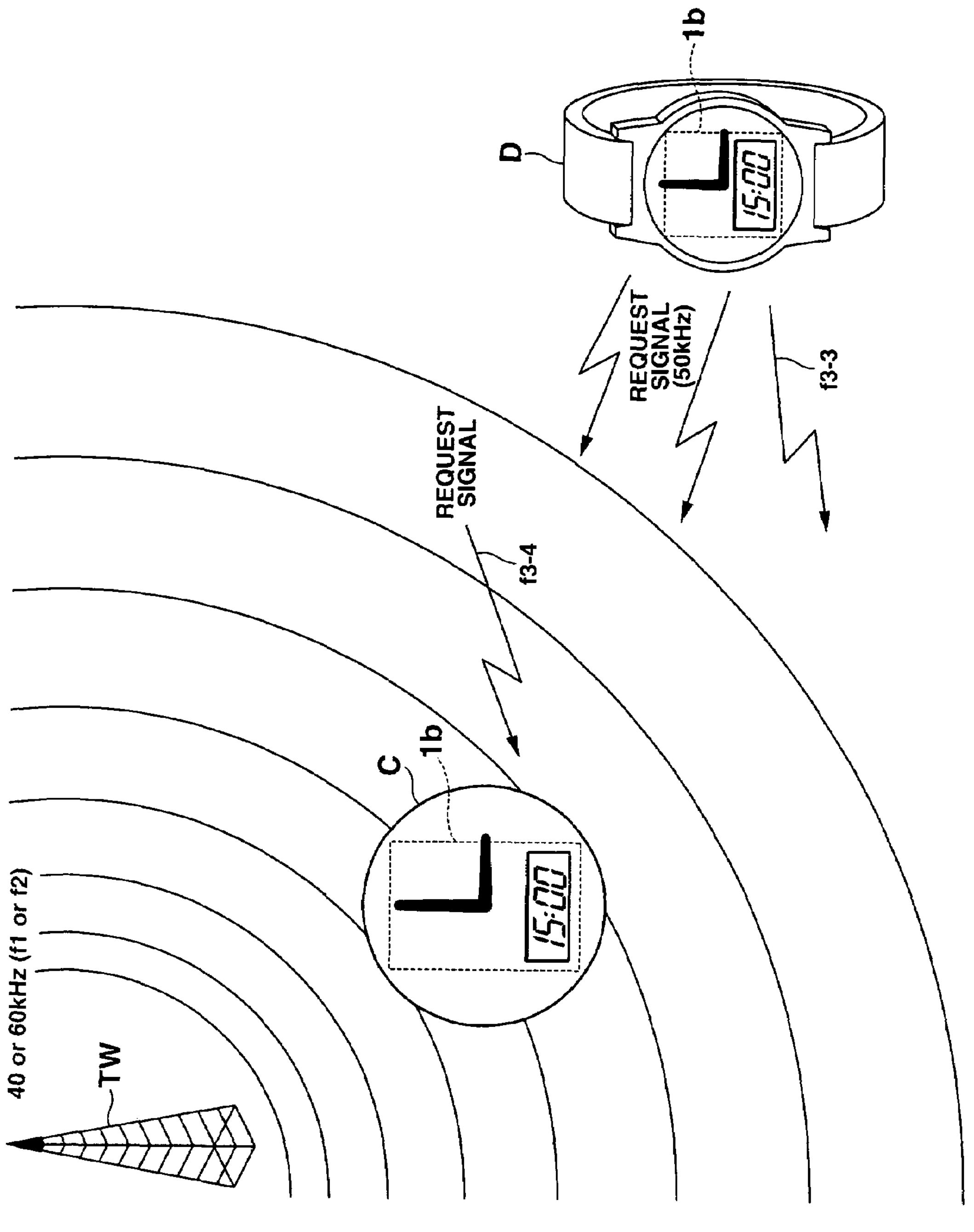
FIG. 7 is a first view for explaining the outline of the radio wave watch of the second embodiment in which the present invention is applied.
Figure 8:
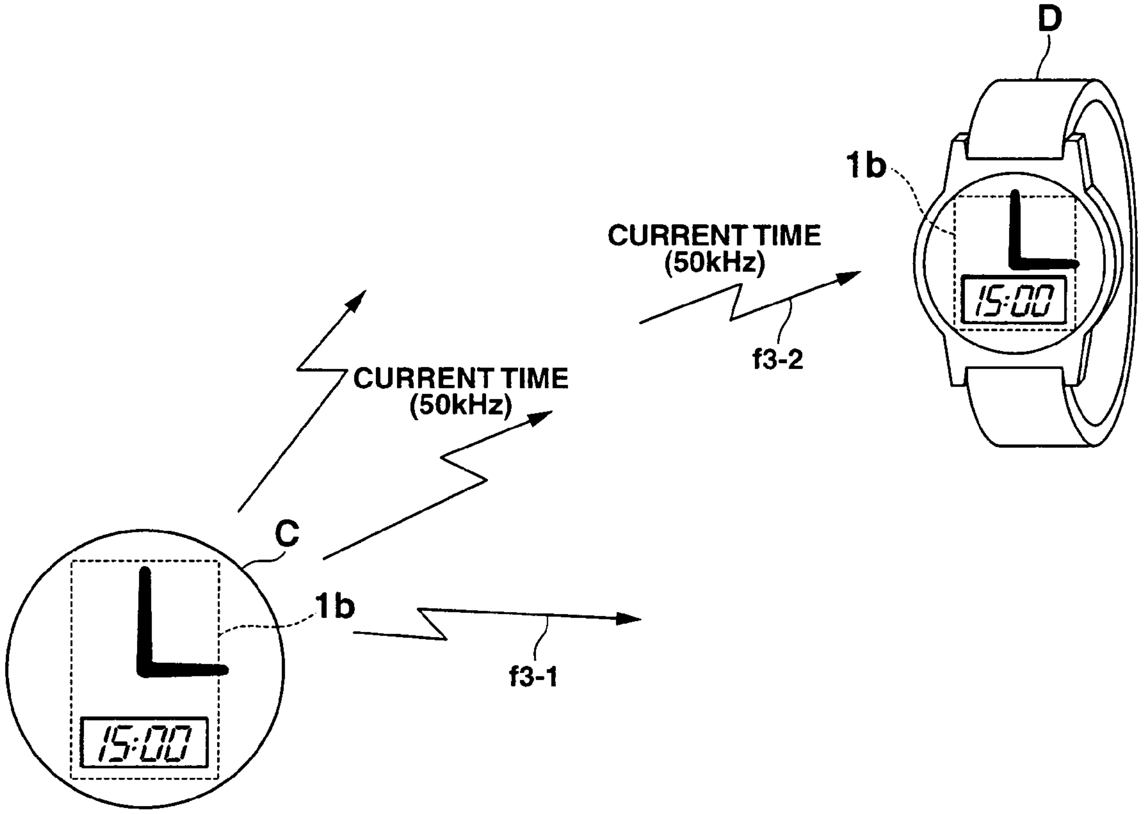
FIG. 8 is a second view for explaining an outline of the radio wave watch of the second embodiment in which the present invention is applied.

FIGS. 7 and 8 are views for explaining the outline of the operation of a radio wave watches C and D in each of which the same radio wave watch control device 1*b* is stored. In FIG. 7, similar to the radio wave watches A and B in the first embodiment, the radio wave watch C can receive the standard wave f1 (or f2) and correct the current time data with the use of the time information included in the radio wave. However, since the radio wave watch D cannot receive the standard wave, the current time data cannot be corrected.

In this case, in the second embodiment, the radio wave watch D transmits a request signal for requesting transmission of the time information to the other radio wave watch control device 1*b* through a relayed radio wave f3-3 of 50 kHz. Meanwhile, when the radio wave watch C which succeeded in correcting the current time received a relayed radio wave f3-4 including the request signal from the other radio wave watch control device 1*b*, the radio wave watch C transmits the measured current time through the relayed radio wave f3-1 as shown in FIG. 8. After transmitting the request signal, the radio wave watch D receives the relayed radio wave f3-2 which was transmitted from the other radio wave watch control device 1*b*, thus enabling to correct the current time data with the use of the time information included in the radio wave.

Figure 9:
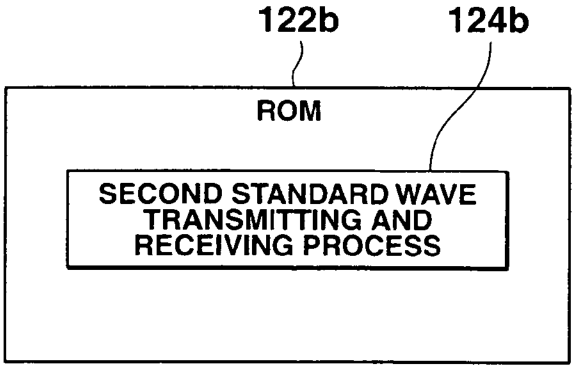
FIG. 9 is a view showing one example of a data structure of a RAM of the second embodiment in which the present invention is applied.

FIG. 9 is a view showing one example of a data structure of the ROM 122*b* in the second embodiment. In this figure, the ROM 122*b* stores a second standard wave transmitting and receiving program 124*b*. The second standard wave transmitting and receiving program 124*b* is a program for realizing the second standard wave transmitting and receiving process (refer to FIG. 12) for performing the reception control of the standard wave, the transmitting and receiving control of the relayed radio wave and the like. Specifically, the CPU 100*b* reads out the second standard wave transmitting and receiving program 124*b* from the ROM 122*b* and expands it in the RAM 120*b* at the predetermined time (for example, 15:00), and performs the second standard wave transmitting and receiving process.

Figure 10:
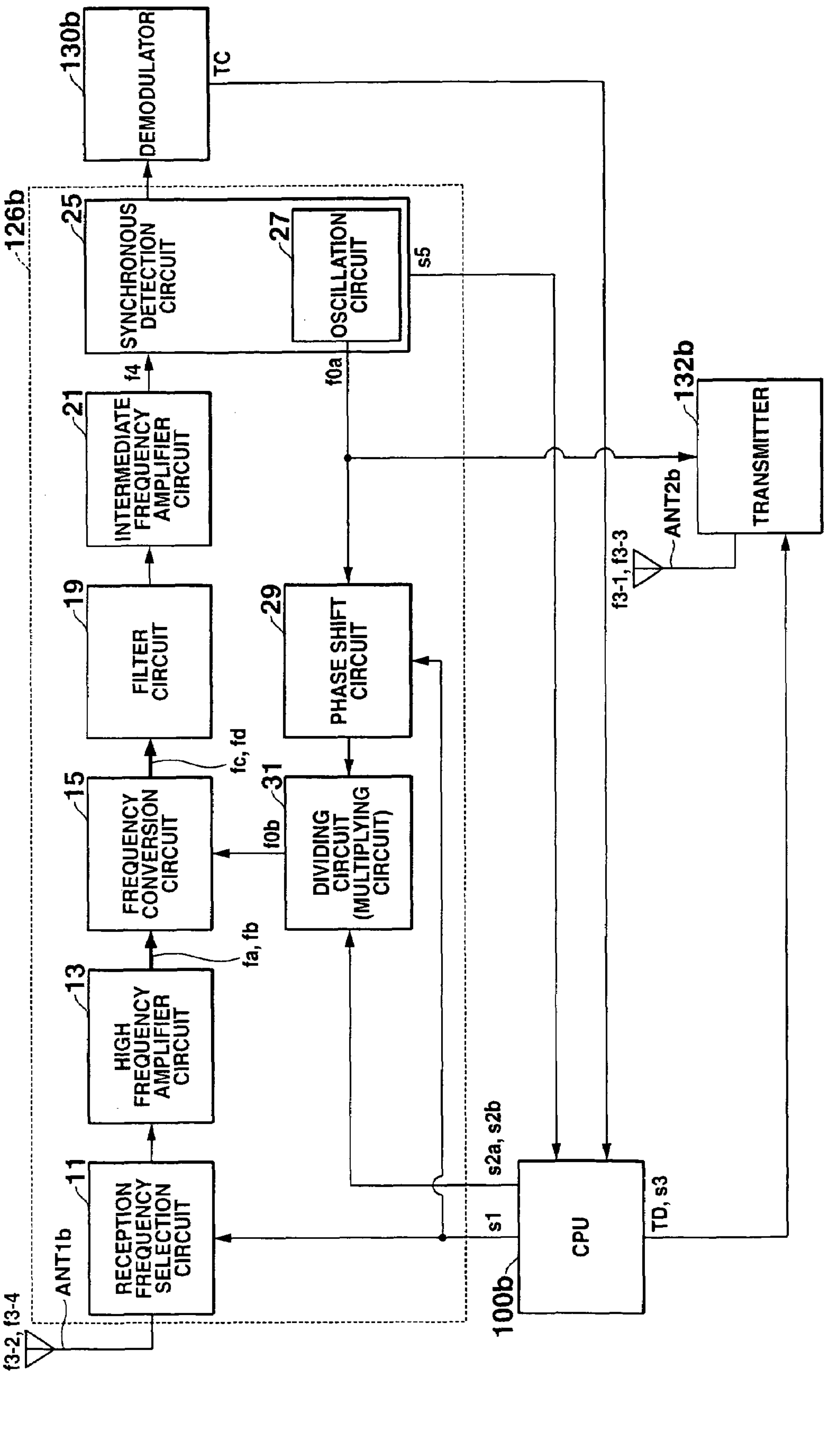
FIG. 10 is a block diagram showing one example of a functional structure of a radio wave reception control circuit of the second embodiment in which the present invention is applied.

FIG. 10 is a block diagram showing one example of a functional structure of the radio wave reception control circuit 126*b*. In this figure, the radio wave reception control circuit 126*b* comprises the antenna ANT1*b*, the reception frequency selection circuit 11, the high frequency amplifier circuit 13, the frequency conversion circuit 15, the filter circuit 19, the intermediate frequency amplifier circuit 21, a synchronous detection circuit 25, a dividing circuit 31 and a phase shift circuit 29.

The synchronous detection circuit 25 comprises an oscillating circuit 27, and matches the phase of the intermediate frequency amplified signal f4 output from the intermediate frequency amplifier circuit 21 to the phase of the output signal of the oscillation circuit 27. The synchronous detection circuit 25 detects a baseband signal from the intermediate frequency amplified signal f4 which was output from the intermediate frequency amplifier circuit 21 by using an oscillation signal f0*a* output from the oscillation circuit 27, and outputs it to the demodulator 130*b*. Further, the synchronous detection circuit 25 judges whether or not the signal level of the intermediate frequency amplified signal f4 is not less than the predetermined signal level, and outputs the judged result to the CPU 100*b* as a reception success or failure signal s5.

The CPU 100*b* judges whether or not the radio wave watch succeeded in receiving the radio signal having the selected frequency by the reception success or failure signal s5 output from the synchronous detection circuit 25 and the standard time code TC output from the demodulator 130*b*.

The oscillation circuit 27 outputs the oscillation signal f0*a* having the same frequency as the intermediate frequency Fi to the synchronous detection circuit 25, the phase shift circuit 29 and the transmitter 132*b*.

The phase shift circuit 29 adjusts the phase of the oscillation signal f0*a* which was output from the oscillation circuit 27 with the phase of the reception signal output from the high frequency amplifier circuit 13 as a standard, and outputs it to the dividing circuit 31, thereby preventing the standard wave f1 (or f2) from having problems when it is received by the antenna ANT1*b*.

For example, it may be such that an amount of phase shift of the phase shift circuit 29 is variable, and the amount of phase shift of the phase shift circuit 29 is selected on the basis on the reception frequency selected by the reception frequency selection circuit 11.

The dividing circuit 31 divides the frequency of the oscillation signal f0*a* the phase of which was adjusted by the phase shift circuit 29, and outputs it as a local oscillation signal f0*b* to the frequency conversion circuit 15. Moreover, the dividing circuit 31 stops the output of the local oscillation signal f0*b* when the output temporarily stopping signal s2*a* is input from the CPU 100*b*, and restarts the output of the local oscillation signal f0*b* when the output restart signal s2*a* is input.

Here, an oscillation frequency F0*a* of the oscillation signal f0*a* is 50 kHz, and the dividing circuit 31 divides the frequency of the oscillation signal f0*a* by five. Thereby, a local oscillation frequency F0*b* becomes 10 kHz, and the intermediate frequency Fi output from the frequency conversion circuit 15 becomes 50 kHz similar to the formulas (f), (g), (h) and (i) in the first embodiment.

The CPU 100*b* performs the switching control of the reception frequency of the reception frequency selection circuit 11 and the output stop control of the local oscillation signal f0*b* by the dividing circuit 31, so that the radio wave reception control circuit 126*b* functions as both of the super-heterodyne system and the straight system similar to the first embodiment.

The transmitter 132*b* generates a carrier having the intermediate frequency Fi based on the oscillation frequency F0*a* of the oscillation signal f0*a* output from the oscillation circuit 27, and transmits the relayed radio wave f3 based on the time data TD or a time data request signal s3 output from the CPU 100*b* to the antenna ANT2*b*.

Figure 11:
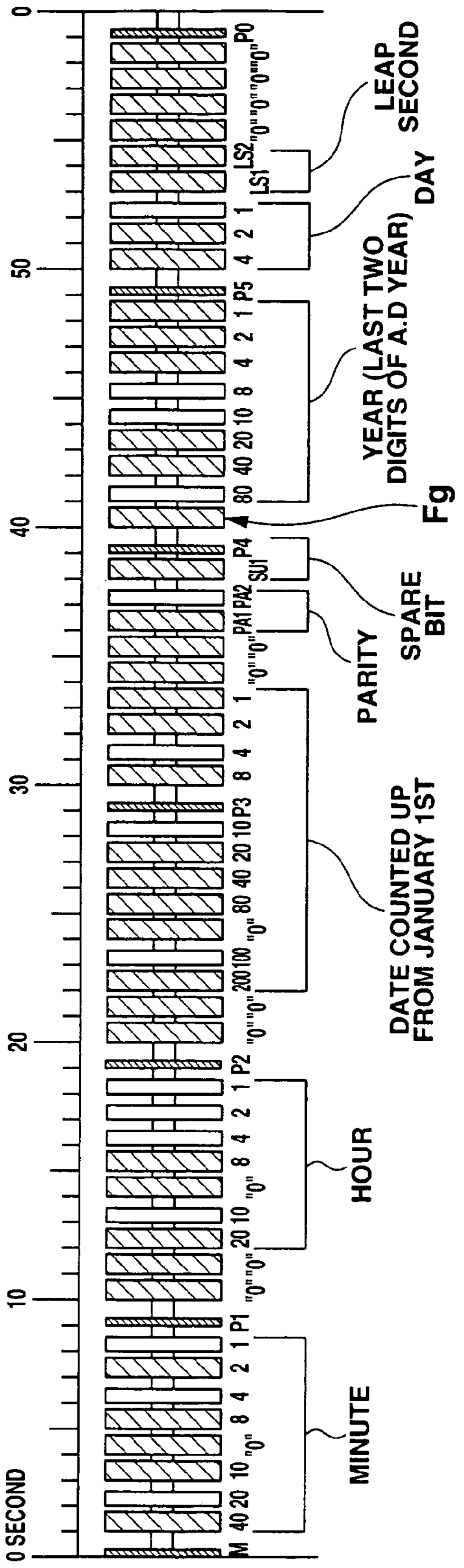
FIG. 11 is a view showing a waveform of a long-wave standard wave of the second embodiment in which the present invention is applied.

The time data request signal s3 is a request signal for requesting the transmission of the time data (time information) to the other radio wave watch. When the time data request signal s3 was output from the CPU 100*b*, the transmitter 132*b* generates the relayed radio wave f3-3 in which a transmission request flag Fg is set to "1" (for example, modulate the carrier with the modulation degree set to 100%) by utilizing unused bit in the standard time code as shown in FIG. 11 and transmits it.

Figure 12:
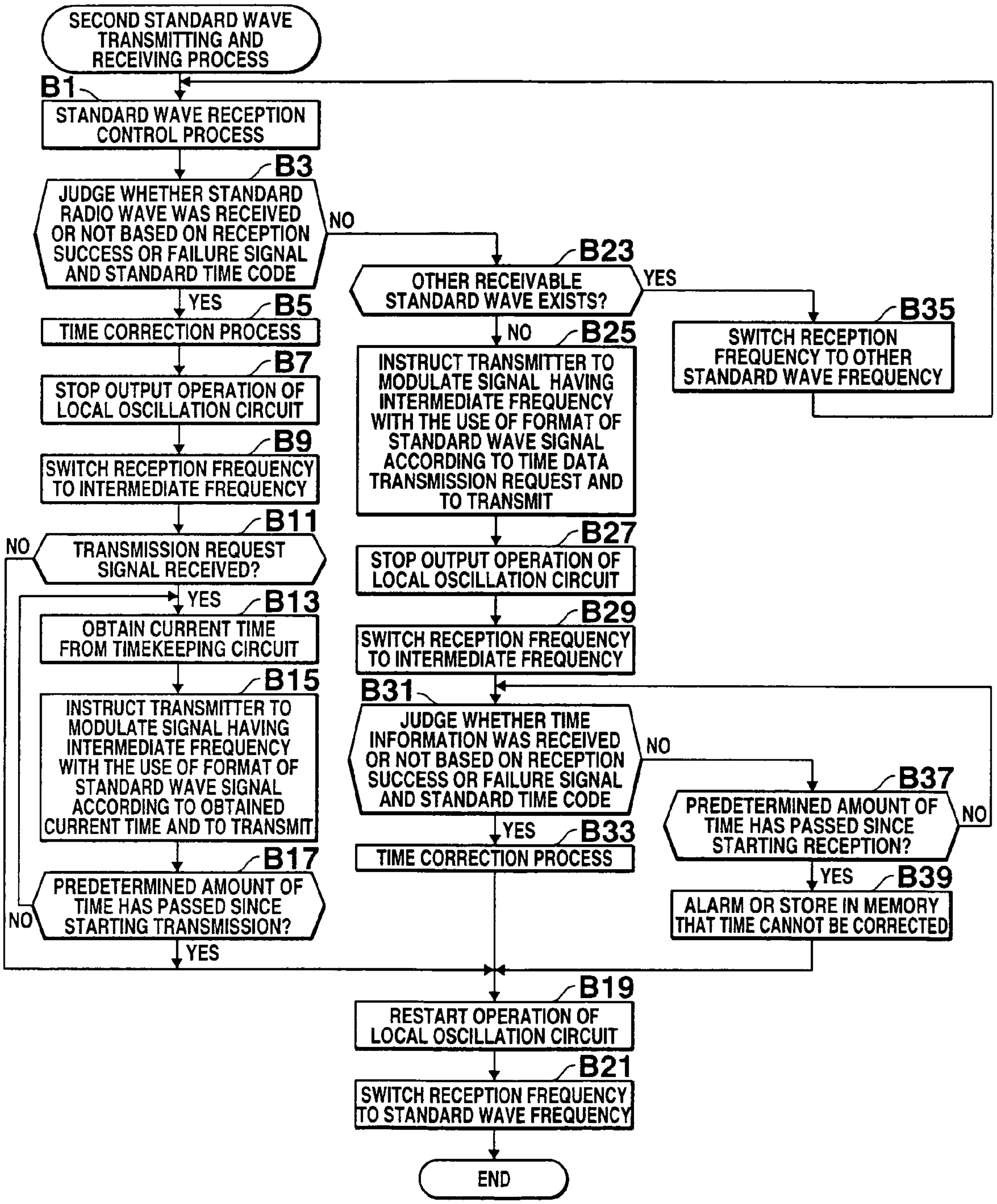
FIG. 12 is a flow chart for explaining the second standard wave transmitting and receiving process of the second embodiment in which the present invention is applied.

Next, a specific operation of the second standard wave transmitting and receiving process in the second embodiment will be explained referring to the flow chart in FIG. 12. In the following explanation, a relayed radio wave transmitted by the radio watch control device 1*b* is defined as the replayed radio waves f3-1 and f3-3, and a relayed radio wave received by the other radio wave watch control device 1*b* as the relayed radio waves f3-2 and f3-4.

First, when the second standard wave transmitting and receiving process is started, the CPU 100*b* drives the radio wave reception control circuit 126*b* and the demodulator 130*b* to start the reception of the standard wave (for example, the standard wave f1 of 40 kHz) (standard wave reception control process; Step B1).

The CPU 100*b* judges whether or not the radio wave watch succeeded in receiving the standard wave by the reception success or failure signal s5 output from the detection circuit 23 and the standard time code TC output from the demodulator 130*b* (Step B3).

In the case where the CPU 100*b* judged that the radio wave watch succeeded in receiving the standard wave (Step B3: Yes), the CPU 100*b* corrects the current time data measured by the timekeeping circuit 106*b* based on the standard time code TC which is output from the demodulator 130*b* (time correction process; Step B5).

Then, the CPU 100*b* controls to output the output temporarily stopping signal s2*a* to the dividing circuit 31 to stop the output operation of the local oscillation signal f0*b* in the circuit (Step B7) Thereafter, the CPU 100*b* controls to output the frequency switching signal s1 to the reception frequency selection circuit 11 to switch the reception frequency of the antenna ANT1*b* to the intermediate frequency Fi (Step B9).

Next, the CPU 100*b* judges whether or not the radio wave watch received a transmission request of the standard time data TD from the other radio wave watch (Step B11). In the case where the CPU 100*b* detected that the transmission request flag Fg of the standard time code TC which was output from the demodulator 130*b* is "1", the CPU 100*b* judges that the transmission request of the time data TD was received (Step B11: Yes), and obtains the current time data measured by the timekeeping circuit 106*b* (Step B13). In the case that the transmission request of the time data TD was not received after a lapse of a predetermined time, the process moves to the Step B19.

The radio signal (carrier) with the intermediate frequency Fi (=third frequency F3) is modulated by using the format of the standard radio signal, and the CPU 100*b* instructs the transmitter 132*b* to transmit the obtained current time data through the relayed radio wave f3-1 (Step B15).

The CPU 100*b* judges whether or not a predetermined amount of time (for example, a few minutes) has passed since starting the instruction of transmitting the relayed radio wave f3-1 (Step B17). In the case where the CPU 100*b* judged that the predetermined amount of time has not passed (Step B17: No), the process moves to the Step B13.

In the case where the CPU 100*b* judged that the predetermined amount of time has passed (Step B17: Yes), the CPU 100*b* outputs the output restart signal s2*b* to the dividing circuit 31 to restart the output operation of the local oscillation signal f0*b* in the circuit (Step B19). Then, the CPU 100*b* outputs the frequency switching signal s1 to the reception frequency selection circuit 11, and switches the reception frequency of the antenna ANT1*b* to the frequency of the standard wave (first frequency F1 or F2) (Step B21). Thereafter, the CPU 100*b* finishes the second standard wave transmitting and receiving process.

In the Step B3, in the case where the radio wave watch failed in receiving the standard wave (Step B3: No), the CPU 100*b* judges whether or not there is a receivable standard wave (for example, the standard wave f2 of 60 kHz) other that the standard wave which was controlled to receive in the Step B1 (Step B23).

In the case where the CPU 100*b* judged that there is other receivable standard wave (Step B23: Yes), the CPU 100*b* outputs the frequency switching signal s1 to the reception frequency selection circuit 11 to switch to the frequency of the receivable standard wave (Step B35). Thereafter, the process moves to the Step B1 to perform the standard wave reception control process again.

Accordingly, when the radio wave watch succeeded in receiving any one of the standard waves f1 and f2, the operation of the radio wave watch C shown in FIG. 7, that is, correcting the current time data based on the time information included in the received standard wave, and receiving the request signal can be realized. Also, when the request signal from the other radio wave watch control device 1*b* was received, the CPU 100*b* performs control such that the relayed radio wave f3-4 including the current time data is generated and transmitted. Thereby, the operation of the radio wave watch C shown in FIG. 8 can be realized.

In the Step B23, in the case where the CPU 100*b* judged that there is no other receivable standard wave (Step B23: No), that is, in the case of failing in receiving any one of the standard waves f1 and f2, the CPU 100*b* instructs the transmitter 132*b* to transmit the transmission request of the time data by using the format of the standard radio signal through the signal having the intermediate frequency (relayed radio wave f3-4) (Step B25).

Figure 6:
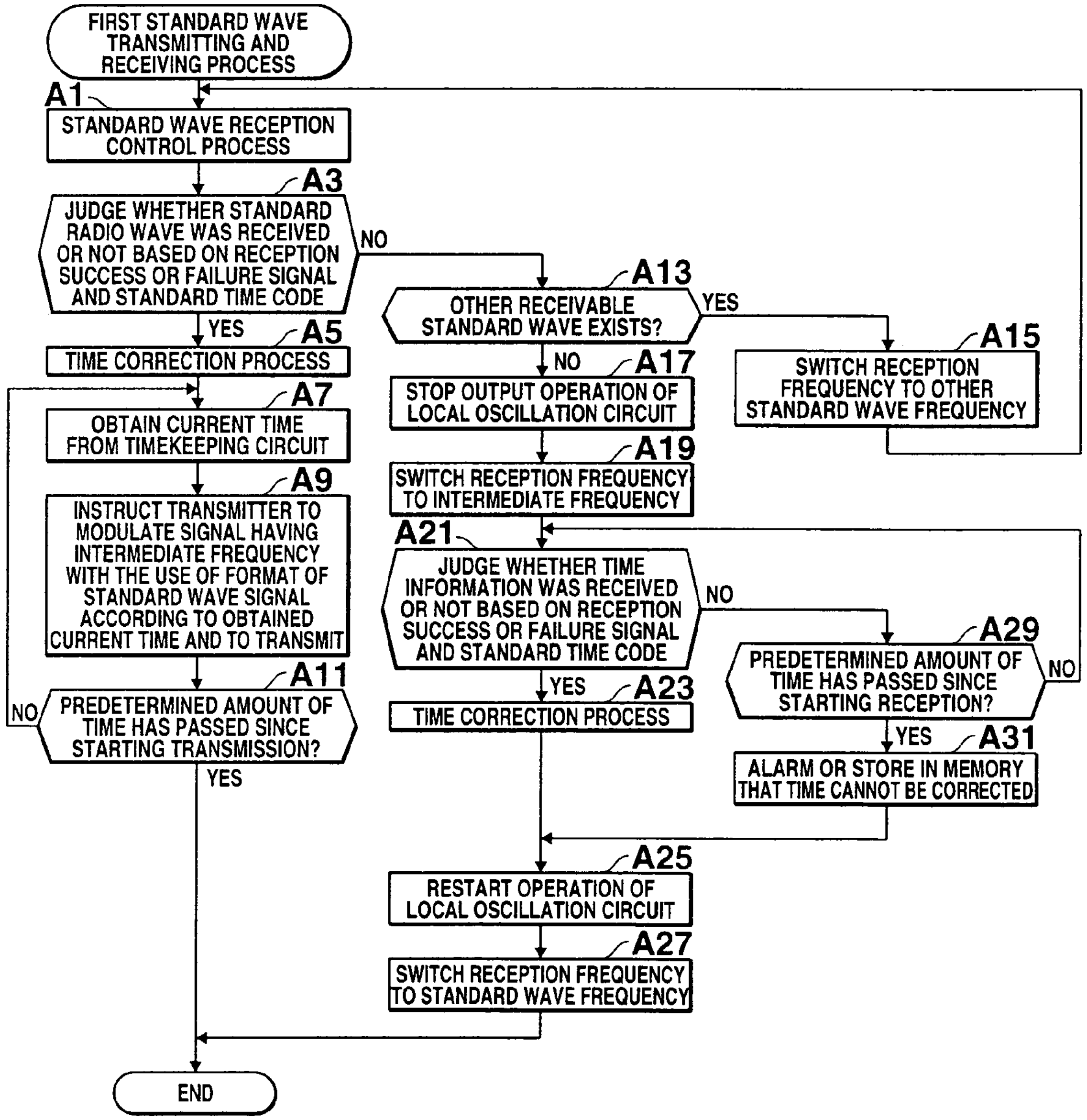
FIG. 6 is a flow chart for explaining the first standard wave transmitting and receiving process of the first embodiment in which the present invention is applied.

After the process of the Step B25, as is the case with the processes in the Steps A17 to A27 of the first standard wave transmitting and receiving process in FIG. 6 explained in the first embodiment, the CPU 100*b* switches the reception frequency to the intermediate frequency, and controls to receive the relayed radio wave f3-2. When the radio wave watch succeeded in receiving the relayed radio wave f3-2, the current time data is corrected based on the time information included in the relayed radio wave f3-2. Thereafter, the second standard wave transmitting and receiving process is finished (Steps B27 to B33 or Step B39→Step B19 to B21).

Accordingly, in the case of failing in receiving any one of the standard waves f1 and f2, the transmission request of the time data to the other radio wave watch control device 1*b* is performed by the relayed radio wave f3-3. Thereby, the operation of the radio wave watch D shown in FIG. 7 can be realized. After the transmission of the relayed radio wave f3-3, in the case of succeeding in receiving the relayed radio wave f3-2 including the time data from the other radio wave watch control device 1*b*, the current time data measured by the time data is corrected. Thus, the operation of the radio wave watch D shown in FIG. 8 can be realized.

As above, according to the second embodiment, the transmission request of the time data TD to the other radio wave watch control device 1*b* is performed by changing the transmission request flag Fg in the relayed radio wave watch f3. Therefore, the frequency which is different from that of the relayed radio wave watch f3 used for transmitting the time data TD is not separately needed for performing the transmission request of the time data TD.

The frequency of the oscillation signal f0*a* which is output from the oscillation circuit 27 in the synchronous detection circuit 25 is divided to generate the local oscillation signal f0*b*. The transmitter 132*b* generates a carrier based on the oscillation signal f0*a* which is output from the oscillation circuit 27, and transmits the relayed radio wave f3. Thereby, the synchronous detection, and generation of the local oscillation signal f0*b* and the carrier can be performed based on one oscillation signal f0*a* which is output from the oscillation circuit 27.

According to the second embodiment, the explanation was made in which the local oscillation signal f0*b* is generated by dividing the frequency of the oscillation signal f0*a* by the dividing circuit 31, however, the following method may be applied. That is, the local oscillation signal f0*b* is generated by multiplying the frequency of the oscillation signal f0*a* by a multiply circuit, and is output to the frequency conversion circuit 15. Specifically, the oscillation frequency F0*a* is set to 10 kHz. The oscillation signal f0*a* is multiplied by five by the multiply circuit to be the local oscillation signal f0*b* of 50 kHz. In the case of receiving the standard wave f1 of 40 kHz, the reception signal is converted into the intermediate frequency Fi of 10 kHz. The reception signal in the case of receiving the standard wave f2 of 60 kHz is also converted into the intermediate frequency Fi of 10 kHz. Thereby, even in the case of replacing the dividing circuit with the multiplying circuit, the synchronous detection, generation of the local oscillation signal f0*b* and the carrier can be performed based on one oscillation signal f0*a*1 output from the oscillation circuit 27.

In the first and second embodiments, the explanation was made in which the CPU stops the output operation of the oscillation circuit 17 or the dividing circuit 31 to receive the relayed radio wave f3, however, for example, the following method may be applied. That is, it is assumed that the frequency conversion circuit 15 comprises an amplifier circuit. After amplifying the input local oscillation signals f0 and f0*b* to the signal level appropriate for synthesis by the amplifier circuit, the local oscillation signals f0 and f0*b* are synthesized with the reception signal. More specifically, in the case where the CPU switches the reception frequency to the third frequency F3, the frequency conversion circuit 15 temporarily changes the base voltage of the amplifier circuit to attenuate the local oscillation signals f0 and f0*b* input from the frequency conversion circuit 15 to a signal having a certain voltage level. Thereby, the frequency conversion circuit 15 directly outputs the reception signal to the filter circuit 19. Accordingly, as in the above embodiment, in the case where the reception frequency is the third frequency F3, the radio wave reception control circuit 126*b* functions to perform reception in the straight system.

The explanation was made in which in the case of failing in receiving the standard wave at the predetermined time, the time data is received from the other radio wave watch control device 1*b* by automatically transmitting the transmission request of the time data, however, for example, it may be such that the transmission request of the time data is transmitted according to a predetermined operation by a user.

According to the present invention, when the detected time information was judged to be correct, the received radio signal (reception signal) is converted into the intermediate frequency signal, and thereafter the detection of the time information and the time correction are performed. Meanwhile, when the detected time information was judged to be incorrect, the operation of the local oscillation section or the local oscillation circuit is stopped, and the received radio signal is directly output as the intermediate frequency signal without performing frequency conversion to perform detection of the time information and the time correction.

Therefore, there is no need to provide a circuit which receives each of the radio wave with the intermediate frequency and the radio wave with the frequency other than the intermediate frequency, so that the radio signals with various frequencies can be received with a relatively simple circuit structure.

Moreover, according to the present invention, the radio wave receiving device and the radio receiving circuit for transmitting the current time through the carrier having the same frequency as the intermediate frequency are realized. Since the frequency of the carrier used for transmitting the current time is the intermediate frequency, the carrier is not superposed on the original radio signal to be received. Thus, the current time can be transmitted without damaging the radio signal.

Moreover, according to the present invention, when the detected time information was judged to be incorrect, the radio signal including the time information which was transmitted from the other device according to the transmission of the request signal is directly output as the intermediate frequency signal, and the detection of the time information and the time correction are performed.

Moreover, according to the present invention, when the request signal transmitted from the other device was detected, the current time can be transmitted through the carrier having the same frequency as that of the intermediate frequency signal.

Moreover, according to the present invention, the frequency conversion of the reception signal is performed by using the oscillation signal which frequency was divided or multiplied by a frequency conversion section or a frequency conversion circuit. Therefore, both of the frequency conversion of the reception signal and the detection of the intermediate frequency signal supplied from the frequency conversion section or the frequency conversion circuit can be performed with one oscillation signal.

Further, according to the present invention, when the reception frequency is different from the intermediate frequency, the reception signal and the local oscillation signal are synthesized to generate the signal having the intermediate frequency, and thereafter the detection is performed. Meanwhile, when the reception frequency accords to the intermediate frequency, the reception signal is regarded as the signal having the intermediate frequency as it is to be detected.

Thereby, a circuit to receive the reception signal having the same frequency as the intermediate frequency and the reception signal having the frequency different from the intermediate frequency can be realized with a simple structure.

What is claimed is:

1. A radio wave receiving device comprising:

a timekeeping section which measures a current time;

a receiving section which receives a radio signal including time information;

a local oscillation section which outputs a local oscillation signal having a predetermined frequency;

a frequency conversion section, connected to the receiving section and the local oscillation section, which converts a frequency of the radio signal from the receiving section to an intermediate frequency signal having a frequency that is determined based on the frequencies of the radio signal and the local oscillation signal, and which outputs the intermediate frequency signal when the local oscillation signal is supplied from the local oscillation section, and directly outputs the radio signal from the receiving section as the intermediate frequency signal when the local oscillation signal is not supplied from the local oscillation section;

a time information detection section which performs an operation to detect the time information from the intermediate frequency signal that is output from the frequency conversion section;

a judgment section which judges whether the time information detected by the time information detection section is correct or incorrect;

a stop control section which stops operation of the local oscillation section when the judgment section judges that the time information is incorrect;

a time correction section which corrects the current time measured by the timekeeping section based on the time information detected by the time information detection section when the judgment section judges that the time information is correct; and a transmission section which modulates a carrier having a same frequency as that of the intermediate frequency signal according to the current time corrected by the time correction section, and which transmits the carrier.

2. The radio wave receiving device as claimed in claim 1, further comprising a transmission request section which transmits a request signal for requesting transmission of the radio signal including the time information and which stops the operation of the local oscillation section, when the judgment section judges that the time information is incorrect.

3. The radio wave receiving device as claimed in claim 1, wherein the receiving section comprises a request signal reception section which receives a request signal that is transmitted from another device, and wherein the radio wave receiving device further comprises:

a request signal detection section which performs an operation to detect the request signal from the intermediate frequency signal output from the frequency conversion section; and wherein, when the request signal is detected by the request signal detection section, the transmission section modulates the carrier according to the corrected current time, and transmits the carrier.

4. The radio wave receiving device as claimed in claim 1, wherein the time information detection section comprises:

a synchronous detection section which includes an oscillator for outputting an oscillation signal having a same frequency as that of the intermediate frequency signal, and which detects the intermediate frequency signal that is supplied from the frequency conversion section by using the oscillation signal; and a demodulation section which demodulates the time information from the intermediate frequency signal detected by the synchronous detection section, and wherein the local oscillation section comprises a dividing section for dividing or multiplying the oscillation signal from the oscillator.

5. A radio wave receiving device comprising:

a receiving section which receives a radio signal and outputs the radio signal as a reception signal;

a local oscillation section which outputs a local oscillation signal having a predetermined frequency;

a reception frequency control section which controls whether or not to select a frequency of the reception signal to be received by the receiving section that is the same as a predetermined intermediate frequency;

a frequency conversion section which outputs the reception signal as an intermediate frequency signal when the frequency of the reception signal is selected to be the same as the intermediate frequency by the reception frequency control section, and which generates the intermediate frequency signal by synthesizing the reception signal with the local oscillation signal and outputs the intermediate frequency signal when the frequency of the reception signal is not selected to be the same as the intermediate frequency;

a detection/demodulation section which detects and demodulates the intermediate frequency signal output from the frequency conversion section to obtain information included in the radio signal;

a judgement section which judges whether the information obtained by the detection/demodulation section is correct or incorrect;

a selection control section which allows the reception frequency control section to select the frequency of the reception signal to be received that is the same as the predetermined intermediate frequency when the judgement section judges that the obtained information is incorrect;

a correction section which corrects a predetermined information based on the information obtained by the detection/demodulation section when the judgement section judges that the obtained information is correct; and a transmission section which modulates a carrier having a same frequency as that of the intermediate frequency signal according to the information corrected by the correction section, and which transmits the carrier.

6. A radio wave receiving circuit comprising:

a timekeeping circuit which measures a current time;

a receiving circuit which receives a radio signal including time information;

a local oscillation circuit which outputs a local oscillation signal having a predetermined frequency;

a frequency conversion circuit, connected to the local oscillation circuit, which converts a frequency of the received radio signal to an intermediate frequency signal having a frequency that is determined based on the frequencies of the radio signal and the local oscillation signal, and which outputs the intermediate frequency signal when the local oscillation signal is supplied from the local oscillation circuit, and directly outputs the received radio signal as the intermediate frequency signal when the local oscillation signal is not supplied from the local oscillation circuit;

a time information detection circuit which performs an operation to detect the time information from the intermediate frequency signal that is output from the frequency conversion circuit;

a judgment circuit which judges whether the time information detected by the time information detection circuit is correct or incorrect;

a stop control circuit which stops operation of the local oscillation circuit when the judgment circuit judges that the time information is incorrect;

a time correction circuit which corrects the current time measured by the timekeeping circuit based on the time information detected by the time information detection circuit when the judgment circuit judges that the time information is correct; and a transmission circuit which modulates a carrier having a same frequency as that of the intermediate frequency signal according to the current time corrected by the time correction circuit, and which transmits the carrier.

7. The radio wave receiving circuit as claimed in claim 6, further comprising a transmission request circuit which transmits a request signal for requesting transmission of the radio signal including the time information and which stops the operation of the local oscillation circuit, when the judgment circuit judges that the time information is incorrect.

8. The radio wave receiving circuit as claimed in claim 6, further comprising:

a request signal detection circuit which performs an operation to detect a request signal from the intermediate frequency signal output from the frequency conversion circuit when the request signal transmitted from another device is received; wherein, when the request signal is detected by the request signal detection circuit, the transmission circuit modulates the carrier according to the corrected current time, and transmits the carrier.

9. The radio wave receiving circuit as claimed in claim 6, wherein the time information detection circuit comprises:

a synchronous detection circuit which includes an oscillator for outputting an oscillation signal having a same frequency as that of the intermediate frequency signal, and which detects the intermediate frequency signal that is supplied from the frequency conversion circuit by using the oscillation signal; and a demodulation circuit which demodulates the time information from the intermediate frequency signal detected by the synchronous detection circuit, and wherein the local oscillation circuit comprises a dividing circuit for dividing or multiplying the oscillation signal from the oscillator.

10. A radio wave receiving circuit comprising:

a local oscillation circuit which outputs a local oscillation signal having a predetermined frequency;

a reception frequency control circuit which controls whether or not to select a frequency of a reception signal to be received that is the same as a predetermined intermediate frequency;

a frequency conversion circuit which outputs the reception signal as an intermediate frequency signal when the frequency of the reception signal is selected to be the same as the intermediate frequency by the reception frequency control circuit, and which generates the intermediate frequency signal by synthesizing the reception signal with the local oscillation signal and outputs the intermediate frequency signal when the frequency of the reception signal is not selected to be the same as the intermediate frequency;

a detection/demodulation circuit which detects and demodulates the intermediate frequency signal that is output from the frequency conversion circuit to obtain information included in the reception signal;

a judgement circuit which judges whether the information obtained by the detection/demodulation circuit is correct or incorrect;

a selection control circuit which allows the reception frequency control circuit to select the frequency of the reception signal to be received that is the same as the predetermined intermediate frequency when the judgement circuit judges that the obtained information is incorrect;

a correction circuit which corrects a predetermined information based on the information obtained by the detection/demodulation circuit when the judgement circuit judges that the obtained information is correct; and a transmission circuit which modulates a carrier having a same frequency as that of the intermediate frequency signal according to the information corrected by the correction circuit, and which transmits the carrier.

* * * * *